(12) United States Patent
Kiryu

(10) Patent No.: US 10,072,555 B2
(45) Date of Patent: Sep. 11, 2018

(54) EXHAUST SYSTEM

(71) Applicant: Honda Motor Co., Ltd., Tokyo (JP)

(72) Inventor: Daisuke Kiryu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/388,142

(22) Filed: Dec. 22, 2016

(65) Prior Publication Data

US 2017/0184006 A1 Jun. 29, 2017

(30) Foreign Application Priority Data

Dec. 24, 2015 (JP) .................................. 2015-250810

(51) Int. Cl.
*B60K 13/04* (2006.01)
*F01N 13/08* (2010.01)

(52) U.S. Cl.
CPC ............ *F01N 13/082* (2013.01); *B60K 13/04* (2013.01); *F01N 2470/14* (2013.01)

(58) Field of Classification Search
CPC ...... F01N 13/082; F01N 13/08; F01N 3/2053; F01N 3/0814; F01N 3/0211; F01N 3/20
See application file for complete search history.

(56) References Cited

U.S. PATENT DOCUMENTS

| | | | | |
|---|---|---|---|---|
| 3,705,497 A * | 12/1972 | Hollins | ...................... | F01N 3/20 123/572 |
| 4,061,117 A * | 12/1977 | Ikeura | ................. | F02D 41/1494 123/41.31 |
| 4,132,194 A * | 1/1979 | Saito | ........................ | F02D 35/00 123/672 |
| 4,899,540 A * | 2/1990 | Wagner | ................. | F01N 3/0211 55/282 |
| 5,191,766 A * | 3/1993 | Vines | .................... | F01K 23/065 180/301 |
| 5,603,216 A * | 2/1997 | Guile | .................... | F01N 3/0814 60/288 |
| 6,352,068 B1 * | 3/2002 | Jacobsen | .................... | F01N 1/14 123/585 |
| 6,389,804 B1 * | 5/2002 | Yasui | .................... | F01N 3/0814 60/274 |
| 2001/0008616 A1* | 7/2001 | Haga | .................. | B01D 53/9454 422/234 |
| 2003/0046926 A1* | 3/2003 | Watanabe | ............. | F01N 3/0814 60/278 |
| 2006/0053771 A1* | 3/2006 | Murata | ................. | F01N 3/2053 60/285 |
| 2014/0202785 A1* | 7/2014 | Hanashima | ............. | F01N 13/08 180/309 |

FOREIGN PATENT DOCUMENTS

JP 5559097 B2 7/2014

* cited by examiner

*Primary Examiner* — Hau V Phan
(74) *Attorney, Agent, or Firm* — Westerman, Hattori, Daniels & Adrian, LLP

(57) ABSTRACT

An exhaust system for discharging an exhaust gas of an engine includes a tail pipe 39 provided with a pressure control valve 1 which reduces an exhaust amount of the gas at the time of low load of the engine, and other tail pipe 40 not provided with the pressure control valve 1. An exhaust port 39a of the tail pipe 39 provided with the pressure control valve 1 faces downward as compared with an exhaust port 40a of the other tail pipe 40 not provided with the control valve 1.

5 Claims, 9 Drawing Sheets

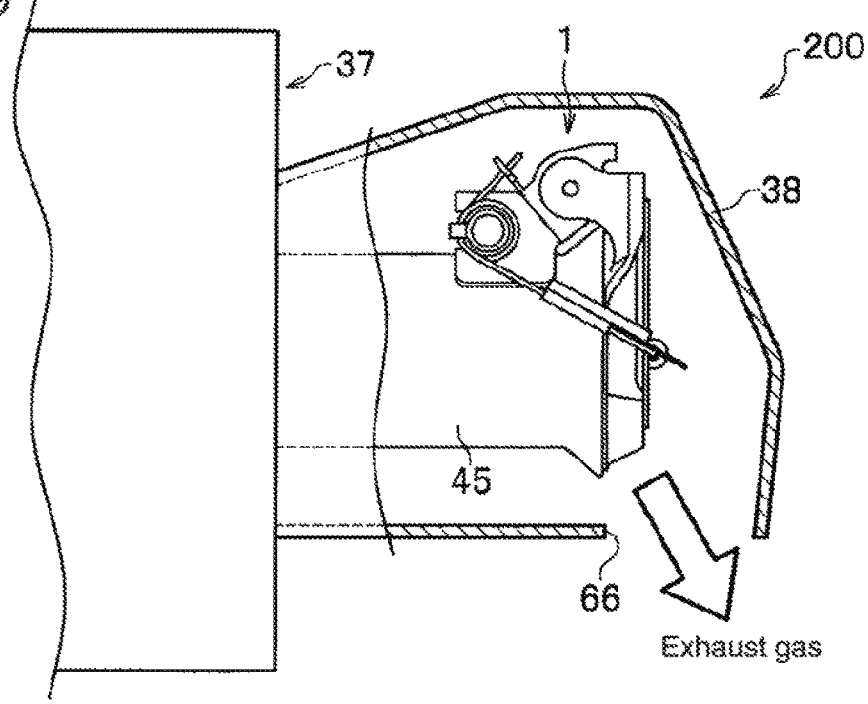
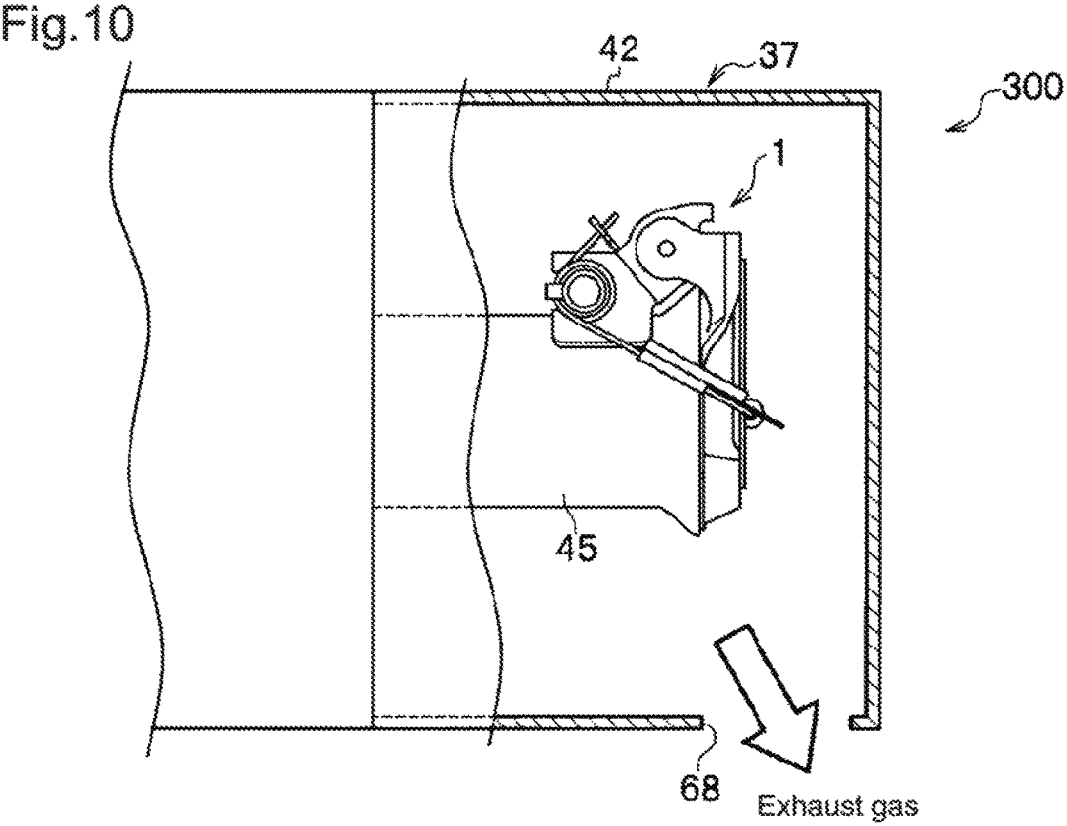

EXHAUST SYSTEM

CROSS-REFERENCE OF RELATED APPLICATION

This application claims priority of Japanese Patent Application No. 2015-250810 filed in Japan on Dec. 24, 2015, the entire contents of which are incorporated herein by reference.

TECHNICAL FIELD

The present invention relates to an exhaust system for exhausting a gas which is discharged from a power plant of a vehicle.

BACKGROUND OF THE INVENTION

For example, in Japanese Patent No. 5,559,097, there is disclosed an exhaust system having two tail pipes which project from silencers in the rearward direction of a vehicle. A pressure control valve for control an exhaust pressure is arranged within a duct of one of the two tail pipes, and the pressure control valve is not arranged within a duct of the other tail pipe. This pressure control valve is formed of a valve of a normally closed type and is maintained in a valve closing state by spring force of a coil spring at the time of low load when the exhaust pressure of the exhaust gas is low.

In the case where the exhaust pressure of the exhaust gas becomes larger than the spring force of the coil spring at the time of high load when the exhaust pressure is high, the pressure control valve is configured to be switched from the valve closing state to a valve opening state.

BY the way, in the exhaust system disclosed in Japanese Patent No. 5,559,097, the exhaust gas is discharged only from the other tail tape in which the pressure control valve is not arranged, for example, at the time of the low load when the exhaust pressure is low. Therefore, in the case where the two tail pipes are arranged in parallel with each other so as to extend in the rearward direction of the vehicle, there is a possibility of deterioration in merchantability because of the unnaturalness when inspected from the outside as the exhaust gas is discharged only from one of the tail tapes.

Further, in some cases, there is a possibility that a person who inspects the two tail pipes from the outside may erroneously recognize that one of the tailpipes does not work properly because of clogging or the like.

SUMMARY OF INVENTION

The present invention has been made in consideration of the above circumstances and has an objective of providing an exhaust system capable of avoiding the deterioration in merchantability and the erroneous recognition.

In order to achieve the above object, according to the present invention, an exhaust system which has at least two or more tail pipes and is configured to exhaust a gas discharged from a power plant, comprises a tail pipe being provided with a control valve (a first tail pipe) which reduces an exhaust amount of the gas at the time of low load of the power plant, and other tail pipe being not provided with the control valve (a second tail pipe), wherein an exhaust port of the tail pipe provided with the control valve faces downward as compared with that of the other tail pipe not provided with the control valve.

According to the present invention, since the exhaust port of the tail pipe provided with the control valve is arranged so as to face downward more than the exhaust port of the tail pipe not provided with the control valve, it becomes difficult to inspect the exhaust port of the tail pipe provided with the control valve when the rear part of the vehicle body is inspected from the rear side of the vehicle. As a result, in the present invention, there is removed such unnaturalness that the gas appears to be discharged only from the tail pipe not provided with the control valve, whereby the deterioration in merchantability can be avoided. In addition, in the present invention, it is possible to avoid such erroneous recognition that the tail pipe may be out of order by clogging or the like.

Further, according to the present invention, the exhaust system which has at least two or more tail pipes and is configured to exhaust the gas discharged from the power plant, comprises the tail pipe being provided with the control valve which reduces the exhaust amount of the gas at the time of the low load of the power plant, and other tail pipe being not provided with the control valve, wherein the tail pipe provided with the control valve overlaps with a rear bumper in the forward and rearward direction of a vehicle, i.e., in a view from the rear side of the vehicle in the a rear-to-front direction.

According to the present invention, since the tail pipe provided with the control valve overlaps with the rear bumper in the forward and rearward direction of the vehicle, it becomes difficult to inspect the exhaust port of the tail pipe provided with the control valve when the rear part of the vehicle body is inspected from the rear side of the vehicle. As a result, in the present invention, it is possible to avoid problems such as the deterioration in merchantability, the erroneous recognition and the like.

Further, according to the present invention, the exhaust system which has at least two or more tail pipes and is configured to exhaust the gas discharged from the power plant, comprises the tail pipe being provided with the control valve which reduces the exhaust amount of the gas at the time of the low load of the power plant, and other tail pipe being not provided with the control valve, wherein the tail pipe provided with the control valve is hidden from sight by the rear bumper when viewed from the rear side of the vehicle.

According to the present invention, since the tail pipe provided with the control valve is hidden from sight by the rear bumper when viewed from the rear side of the vehicle, it becomes difficult to inspect the exhaust port of the tail pipe provided with the control valve when the rear part of the vehicle body is inspected from the rear side of the vehicle. As a result, in the present invention, it is possible to avoid the problems such as the deterioration in merchantability, the erroneous recognition and the like.

Furthermore, according to the present invention, the exhaust system which has at least two or more tail pipes and is configured to exhaust the gas discharged from the power plant, comprises the tail pipe being provided with the control valve which reduces the exhaust amount of the gas at the time of the low load of the power plant, and other tail pipe being not provided with the control valve, wherein the exhaust port of the tail pipe provided with the control valve is visually assimilated to the environs thereof such that the exhaust port can hardly or not be inspected by a person who views the vehicle from the rear side.

According to the present invention, since the exhaust port of the tail pipe provided with the control valve is assimilated to the environs thereof, the exhaust port can hardly or not be inspected by the person who views the vehicle from the rear side. Therefore, in the present invention, it is possible to avoid the problems such as the deterioration in merchantability, the erroneous recognition and the like.

In this case, the assimilation to the environs is performed such that, for example, an outer surface of a neighboring part including the exhaust port of the tail pipe provided with the control valve is colored in black, so that the exhaust port is assimilated to shade of a lower part of a vehicle body, thereby to visually be indistinguishable from the shade. Moreover, when the outer surface of the neighboring part including the exhaust port of the tail pipe provided with the control valve is colored in the same color as the color of the rear bumper, the exhaust port is assimilated to the rear bumper, thereby to visually be indistinguishable from the rear bumper.

Effect of the Invention

In the present invention, it is possible to provide the exhaust system which is capable of avoiding the deterioration in merchantability and the erroneous recognition.

BRIEF DESCRIPTION OF THE DRAWINGS

FIG. 9 is an enlarged cross sectional view of an essential part of the exhaust system in accordance with another embodiment;

FIG. 10 is an enlarged cross sectional view of an essential part of the exhaust system in accordance with still another embodiment;

DETAILED DESCRIPTION OF THE INVENTION

Figure 1:
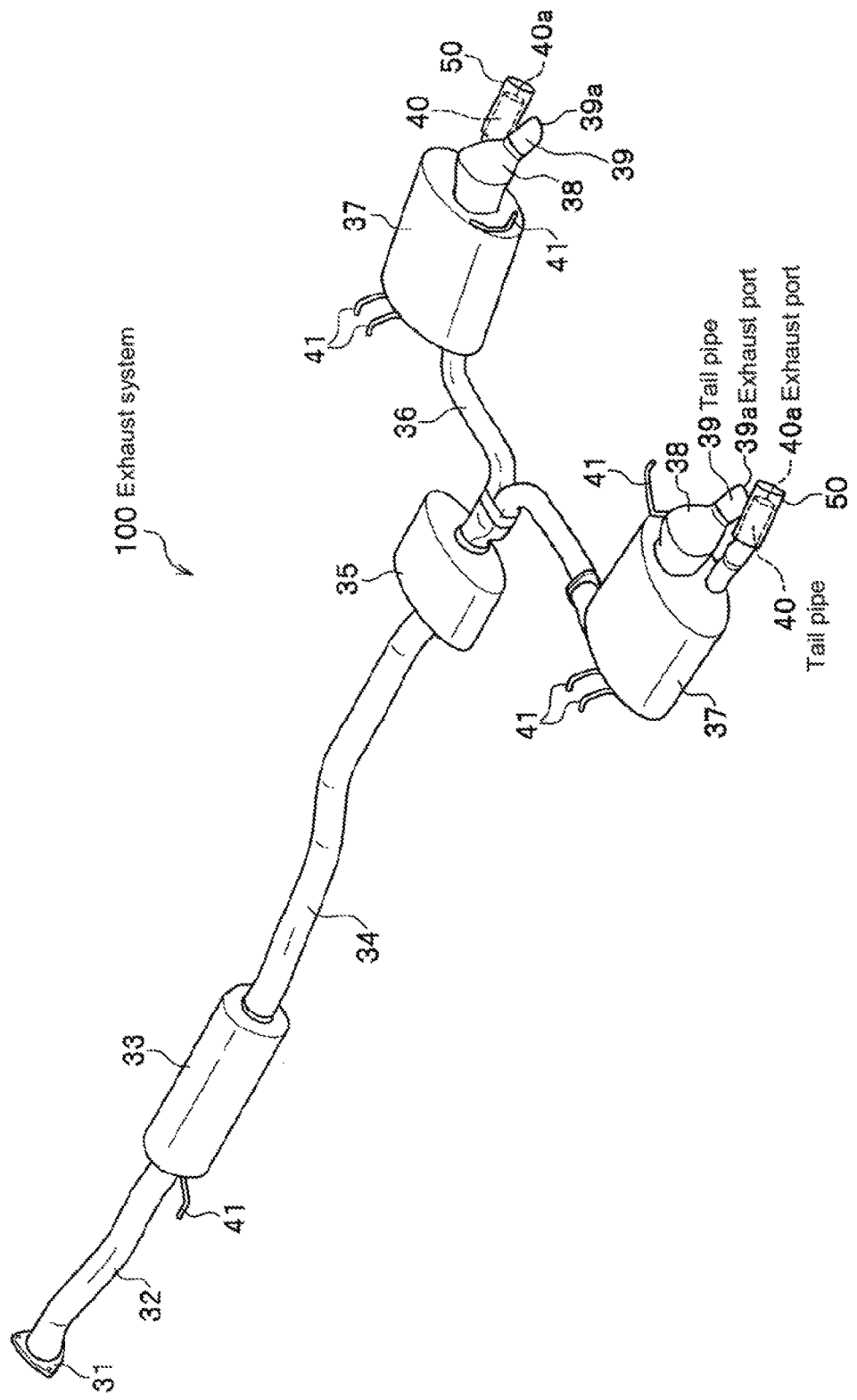
FIG. 1 is a perspective view of an exhaust system in accordance with an embodiment of the present invention.
Figure 2:
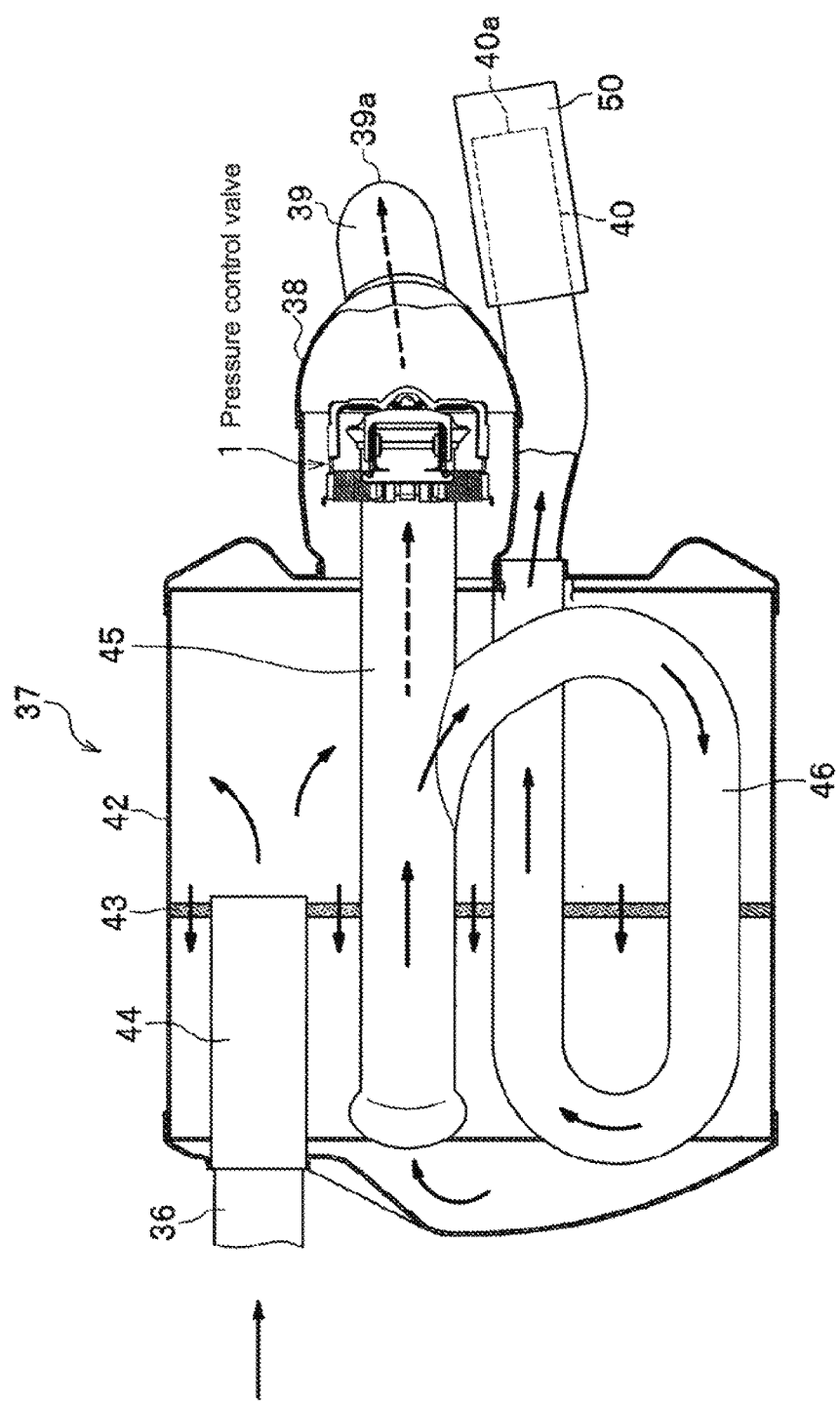
FIG. 2 is a cross sectional view of an essential part of the exhaust system shown in FIG. 1.

Hereunder, embodiments of the present invention will be explained in detail while referring to accompanying drawings appropriately. FIG. 1 is a perspective view of an exhaust system in accordance with an embodiment of the present invention, and FIG. 2 is a cross sectional view of an essential part of the exhaust system shown in FIG. 1;

The exhaust system 100 is connected to an exhaust manifold of an engine (power plant) through an exhaust purification device not shown in the drawing. As shown in FIG. 1, the exhaust system 100 includes a front pipe 32, an exhaust chamber 33, a middle pipe 34, an exhaust chamber 35, a bifurcated rear pipe 36, two silencers 37 arranged in parallel with each other in the vehicle width direction, a valve cover 38 and a tail pipe 40 connected to each of the silencers 37, and a tail pipe 39 connected to the valve cover 38. Herein, on a front end of the front pipe 32 there is provided a flange 31 which is connected to the exhaust manifold of the engine.

In this case, the exhaust chamber 33 arranged on the upstream side functions as a front stage silencer. The exhaust chamber 35 arranged on the downstream side functions as a middle stage silencer, and the juxtaposed two silencers 37 function as a rear stage silencer. Like this, the exhaust system 100 is composed of three stage silencers.

The exhaust gas (gas) flowing through the flange 31 circulates through the front pipe 32 and flows into the exhaust chamber 33. In the exhaust chamber 33, a noise absorption type silencer structure is adopted as the front stage silencer. A noise absorbing material, for example, such as glass wool or the like is accommodated in the exhaust chamber 33.

The exhaust gas circulates from the exhaust chamber 33 through the middle pipe 34 and flows into the exhaust chamber 35. In the exhaust chamber 35, the noise absorption type silencer structure is adopted as the middle stage silencer. The noise absorbing material, for example, such as glass wool or the like is accommodated in the exhaust chamber 35.

Further, the exhaust gas circulates from the exhaust chamber 35 through the rear pipe 36 and flows into the silencer 37. In the silencer 37, an expansion type silencer (silencer of large capacity) structure is adopted as the rear stage silencer. Herein, the structure of the silencer 37 will be explained in detail later.

The exhaust gas circulated from the exhaust chamber 35 through the rear pipe 36 and flows into the silencers 37. The exhaust gas flowing into each of the silencers 37 is discharged into the air along two routes. As shown in FIG. 2, the first route is a route along which the exhaust gas circulates the valve cover 38 and the tail pipe 39 and is discharged from an exhaust port 39a of the tail pipe 39 into the air. The second route is a route along which it circulates through the tail pipe 40 and is discharged from an exhaust port 40a of the tail pipe 40 into the air. Although the case where the two tail pipes 39, 40 are provided is explained in this embodiment, at least two or more tail pipes may be provided without being limited to the case.

Stays 41 are attached to each of the exhaust chamber 33 and the silencer 37. The exhaust system. 100 is hung on a lower part of the vehicle body of the vehicle through the stays 41.

The expansion type silencer (silencer of large capacity) structure is adopted for the silencer 37. The exhaust gas flowing into the silencer 37 circulates from the rear pipe 36 through an inlet pipe 44 and is discharged into a container 42 of large capacity. As a result, a flow passage area of the exhaust gas is changed suddenly (expanded suddenly), so that acoustic energy is attenuated. The exhaust gas in the container 42 penetrates through a separator 43 thereby to flow into a bypass exhaust pipe 45. One end of the bypass exhaust pipe 45 is opened at an interior of the container 42, and the bypass exhaust pipe 45 passes through the container 42. The other end of the bypass exhaust pipe 45 passing through the container 42 is exposed to the outside of the container 42 whereby a pressure control valve (control valve) 1 is mounted thereon.

Further, a main exhaust pipe 46 bifurcated from the bypass exhaust pipe 45 is connected to an intermediate portion of the bypass exhaust pipe 45 located in the container 42 (see FIG. 2). The main exhaust pipe 46 has a pipe diameter which is smaller than the bypass exhaust pipe 45, and is spirally turned around one time whereby a pipe length of the main exhaust pipe is longer than the bypass exhaust pipe 45. The main exhaust pipe 46 is connected to the tailpipe 40. On the exhaust port 40a of the tail pipe 40, a finisher 50 of substantially cylindrical shape is mounted through a screw member 48 (to be referred to later, see FIG. 6). A part of the bypass exhaust pipe 45 located on the outside of the container 42, and the pressure control valve 1 each are covered with the valve cover 38. The valve cover 38 functions not only as a cover of the pressure control valve 1 but also as an inlet pipe for leading the exhaust gas flowing out of the pressure control valve 1, into the tail pipe 39.

At the time of low load of the engine (when being in a low speed rotation range including a start of the engine and an idling rotation), the pressure control valve 1 is maintained in a valve closing state where an opening end 2 of the bypass exhaust pipe 45 is closed since an exhaust pressure of the exhaust gas within the bypass exhaust pipe 45 is low. Accordingly, the exhaust gas circulates through the main exhaust pipe 46 as indicated by arrows of solid line in FIG. 2. Almost all of the exhaust gas is discharged via the main exhaust pipe 46 into the air. In this way, the exhaust noise of the engine at the time of the low load can be reduced efficiently.

At the time of high load of the engine (for example, when being in a high speed rotation range such as passing and the like), the exhaust pressure of the exhaust gas within the bypass exhaust pipe 45 increases and becomes higher than closing force of the pressure control valve 1, so that the pressure control valve 1 opens the opening end 2 of the bypass exhaust pipe 45. In this way, a part of the exhaust gas, as indicated by arrows of dotted line in FIG. 2, is discharged from the bypass exhaust pipe 45 into the air via the pressure control valve 1 which opens the opening end 2 of the bypass exhaust pipe 45, the valve cover 38 and the tail pipe 39 in turn.

At the same time, a part of the exhaust gas is discharged into the air via the main exhaust pipe 46 which is bifurcated from the bypass exhaust pipe 45, and the tail pipe 40 in turn. In this way, the exhaust resistance can be reduced, and the pressure control valve 1 can perform the control for suppressing a rise of the exhaust pressure at the time of the opening, namely, the pressure control of the exhaust pressure.

Figure 3:
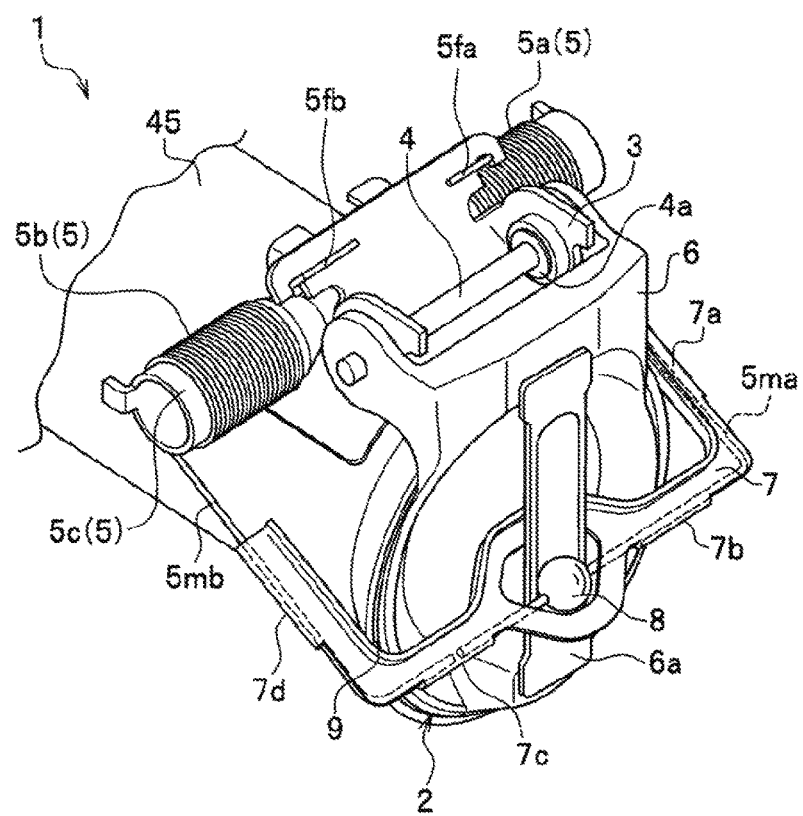
FIG. 3 is a perspective view showing a valve closing state of a pressure control valve incorporated into the exhaust system shown in FIG. 1.
Figure 4:
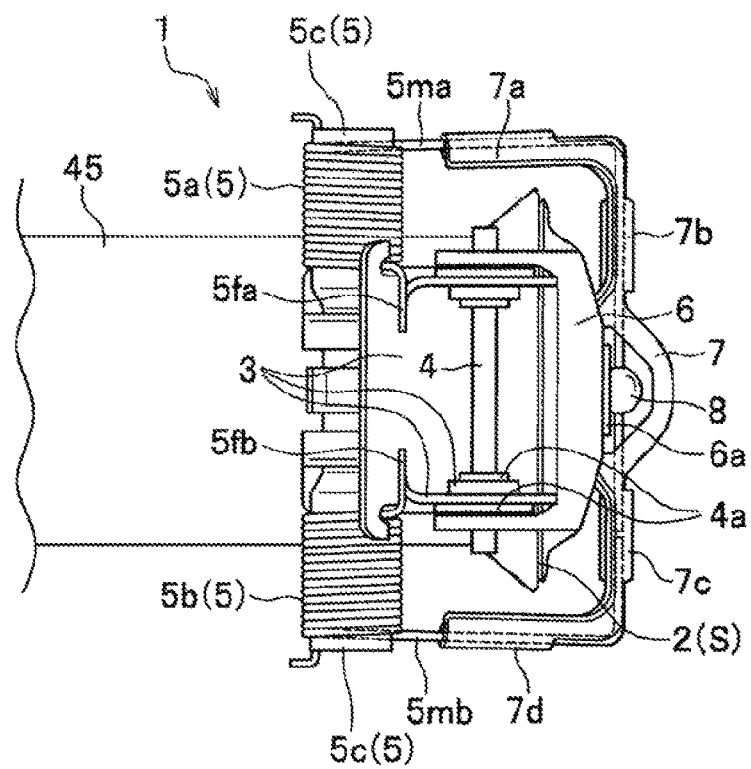
FIG. 4 is a plan view of the pressure control valve shown in FIG. 3.
Figure 5:
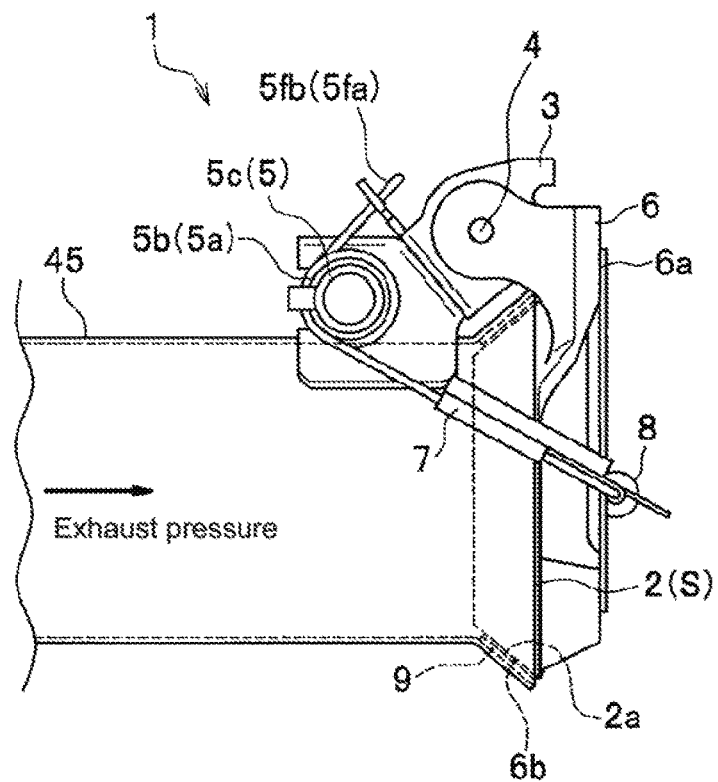
FIG. 5 is a side view of the pressure control valve shown in FIG. 3.

FIG. 3 is a perspective view showing a valve closing state of the pressure control valve 1 incorporated in the exhaust system shown in FIG. 1. FIG. 4 is a plan view of the pressure control valve shown in FIG. 3. FIG. 5 is a side view of the pressure control valve shown in FIG. 3.

The pressure control valve 1 is arranged on the opening end 2 on the downstream side of the bypass exhaust pipe 45 and covered with the valve cover 38. The pressure control valve 1 is supported on a pipe wall of the bypass exhaust pipe 45. The pressure control valve 1 has supporting portions 3. These supporting portions 3 are provided on a pipe wall in the vicinity of the opening end 2 on the downstream side of the bypass exhaust pipe 45. A pivot shaft 4 is rotatably pivoted on the supporting portions 3. Both ends in the axial direction of the pivot shaft 4 are supported on bearings of the supporting portions 3 into which bushings 4a are fitted, respectively. The axial direction of the pivot shaft 4 is approximately parallel to an extending plane of an opening surface S (see FIG. 4) of the opening end 2 of the bypass exhaust pipe 45. A flap valve 6 functioning as a valve body is fixed on the outsides of the bearings of the supporting portions 3 located at each end of the pivot shaft 4. Thus, the flap valve 6 is configured to be rotated at a predetermined angle around the pivot shaft 4 as a rotation axis, so that it can open and close the opening end 2.

Further, on the supporting portions 3, a spring shaft 5c is supported. An axial direction of the spring shaft 5c is approximately parallel to the axial direction of the pivot shaft 4 and approximately parallel to the extending plane of the opening surface S of the opening end 2 of the bypass exhaust pipe 45. The spring shaft 5c has an axis which is different from an axis of the pivot shaft 4 and is provided so as to be spaced apart from the pivot shaft 4.

Two torsion coil springs 5a, 5b (5) are placed around and supported on the spring shaft 5c (see FIG. 3), respectively. The torsion coil spring 5a is provided at one end portion thereof with a fixing arm 5fa and at the other end portion thereof with a movable arm 5ma. Moreover, the torsion coil spring 5b is provided at one end portion thereof with a fixing arm 5fb and at the other end portion thereof with a movable arm 5mb. Each of the fixing arms 5fa, 5fb is caught on and anchored to the supporting portions 3 fixedly secured to the bypass exhaust pipe 45. The movable arms 5ma, 5mb are connected to each other by a joint 7 on the forward side of the opening end 2 (flap valve 6). The joint 7 is arranged to extend from lateral sides of the bypass exhaust pipe 45 to the forward side of the opening end 2 (flap valve 6) and made of a member formed in substantially a U-shape in a plan view.

As shown in FIGS. 3 and 4, the joint 7 is provided with a plurality of caulking portions 7a, 7b, 7c, 7d. The joint 7 is fixedly secured to the movable arm 5ma through the caulking portions 7a, 7b, 7c. Moreover, the joint 7 is fixedly secured to the movable arm 5mb through the caulking portions 7c, 7d. Thus, the joint 7 is configured to be moved integrally with the movable arms 5ma, 5mb.

The joint 7 is provided with a roller 8 on the forward side of the opening end 2 (flap valve 6). This roller 8 has a spherical body, and the movable arm 5ma passes through a through hole formed in the roller 8. The roller 8 is provided to be rotatable around the movable arm 5ma as a rotation axis.

The roller 8 is in pressure contact with a guide 6a provided on the flap valve 6. The roller 8 is provided rollable on the guide 6a in accordance with an opening and closing movement of the flap valve 6 while maintaining a pressure contact relationship with the guide 6a. To the inside of the opening end 2 of the bypass exhaust pipe 45, a flared sealant 9 is attached. An annular opening side sealing surface 2a is formed on the sealant 9. On the flap valve 6, there is formed a valve body side sealing surface 6b which comes into surface contact with a circumference of the opening side sealing surface 2a at the time of closing the opening end 2 (see FIG. 5).

The two torsion coil springs 5a, 5b apply spring force (biasing force) to the flap valve 6 through the joint 7 and the roller 8 thereby to close the opening end 2. In this case, when the exhaust pressure within the bypass exhaust pipe 45 becomes larger than the spring force (biasing force), the flap valve 6 is separated from the opening end 2 so as to open the opening end 2.

Figure 6A:
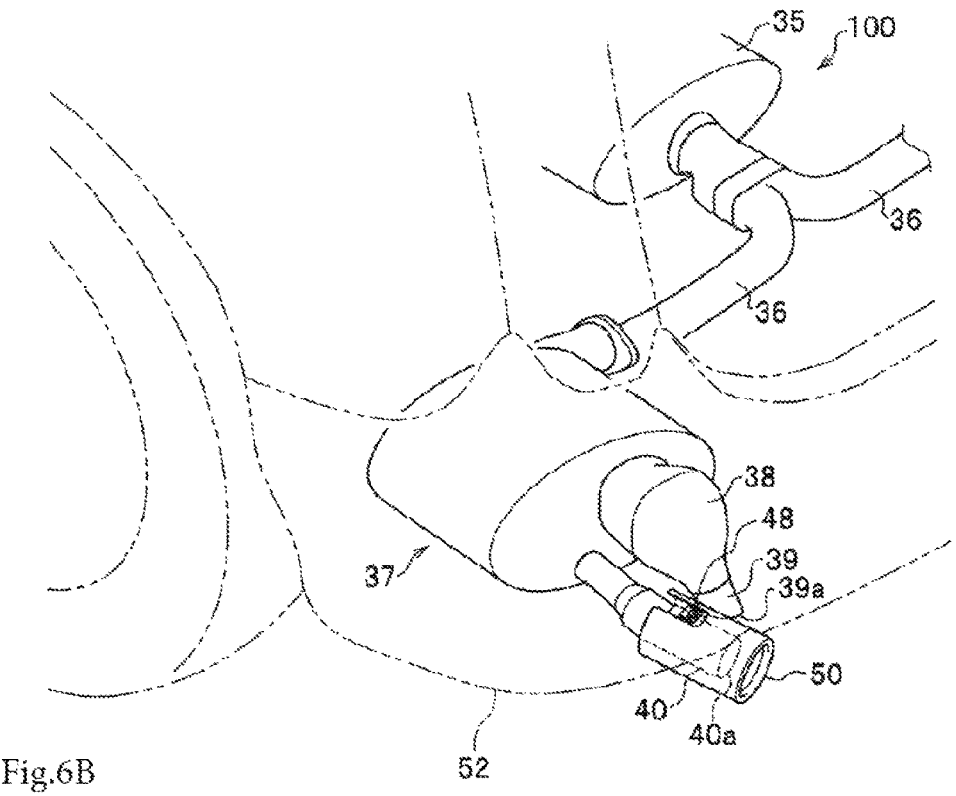
FIG. 6A is a perspective view when viewing a silencer having two tail pipes, in the oblique direction on the rear side of a vehicle.
Figure 6B:
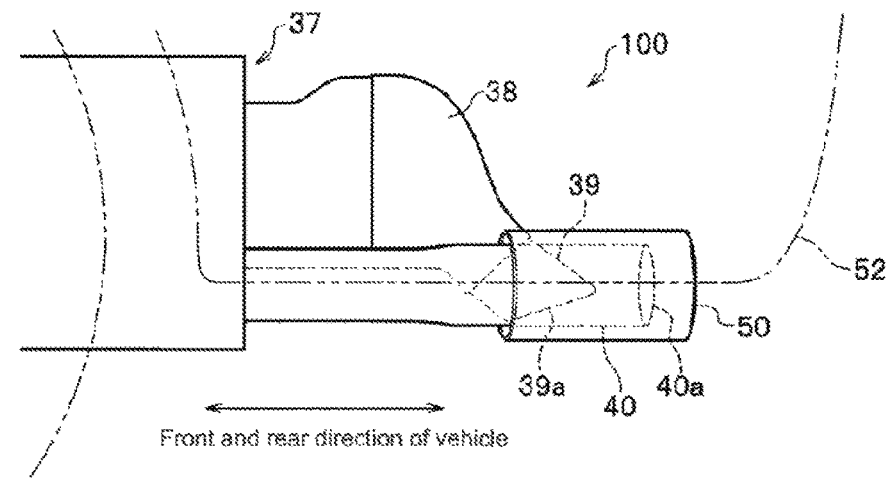
FIG. 6B is an enlarged side view when viewing the two tail pipes in the vehicle width direction.

FIG. 6A is a perspective view when viewing the silencer having two tail pipes, in the oblique direction on the rear side of a vehicle, and FIG. 6B is an enlarged side view when viewing the two tail pipes in the vehicle width direction.

The tail pipe 39 provided with the pressure control valve 1 has the exhaust port 39a for discharging the exhaust gas into the air. This exhaust port 39a is arranged facing obliquely downward in such away as to be inclined toward the rear side of the vehicle (see FIG. 6B). In addition, the tail pipe 39 provided with the pressure control valve 1, and a rear bumper 52 located in a more rearward position of the vehicle body than the tail pipe 39 on the rear side of the vehicle body are arranged so as to overlap with each other in the forward and rearward direction of the vehicle. As a result, the tail pipe 39 provided with the pressure control valve 1 is hidden by the rear bumper 52, so that it becomes difficult to inspect the tail pipe 39 when inspecting a rear part of the vehicle from the rear side of the vehicle.

The tail pipe 40 not provided with the pressure control valve 1 has the exhaust port 40a for discharging the exhaust gas into the air. This exhaust port 40a extends in substantially the horizontal direction and is arranged facing rearward of the vehicle. On the exhaust port 40a of the tail pipe 40 not provided with the pressure control valve 1, the finisher 50 of substantially cylindrical shape is fitted through the screw member 48. The finisher 50 fitted on the exhaust port 40a of the tail pipe 40 projects from the rear side of the vehicle body through a recess 54 of the rear bumper 52, so that it is provided inspectable from the rear side of the vehicle (see FIG. 6A). Herein, the finisher 50 is provided for improving designability of a rear view of the vehicle.

The exhaust port 39a of the tail pipe 39 provided with the pressure control valve 1 is arranged facing downward, as compared with the exhaust port 40a of the tail pipe 40 not provided with the pressure control valve 1 (see FIG. 6B).

With this configuration, in the case of inspecting the rear part of the vehicle body from the rear side of the vehicle, is becomes difficult to inspect the exhaust port 39a of the tail pipe 39 provided with the pressure control valve 1. As a result, there is removed such unnaturalness that the exhaust gas appears to be discharged only from the tail pipe 40 not provided with the pressure control valve 1, whereby the deterioration in merchantability can be suitably avoided. Further, in the case where the exhaust port 39a of the tail pipe 39 on one side and the exhaust port 40a of the tail pipe 40 on the other side appear to be provided side by side like glasses and white smoke is not issued out of the exhaust port 39a of the tail pipe 39 on the one side, it is possible to suitably avoid such erroneous recognition that the tail pipe 39 may be out of order by clogging or the like. Moreover, the possibility of giving an uncomfortable feeling to the inspector who looks at the rear part of the vehicle can be removed. In addition, a state where the exhaust gas is discharged from the exhaust port 40a of the tail pipe 40 not provided with the pressure control valve 1 can be inspected from the rearward position of the vehicle, whereby the tail pipe 40 and the finisher 50 can be used as components for improving the designability.

Figure 7A:
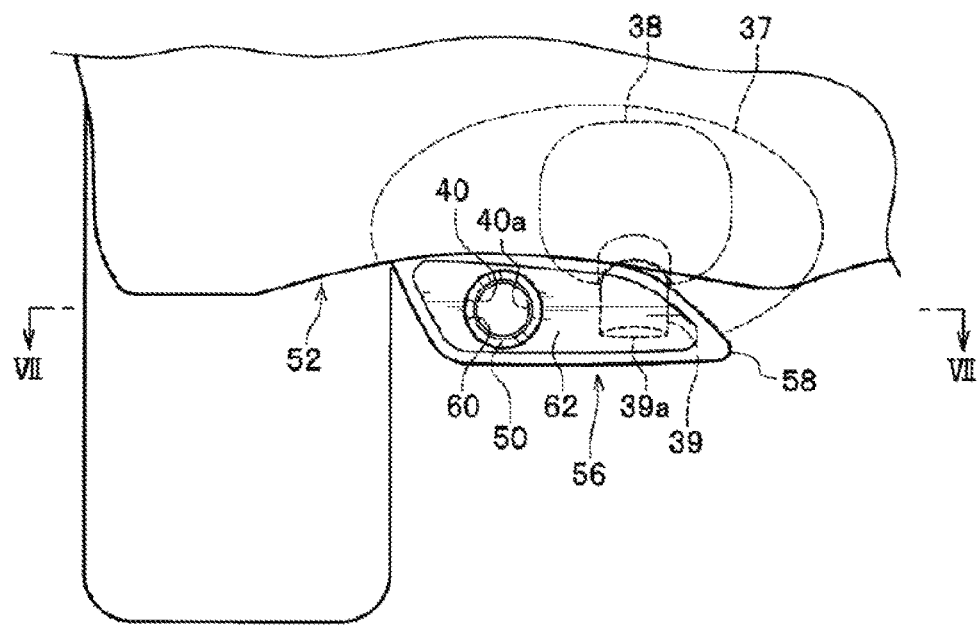
FIG. 7A is an explanatory view when viewing, from the rear side of the vehicle, a state of fitting a finisher to a lower part of a rear bumper.
Figure 7B:
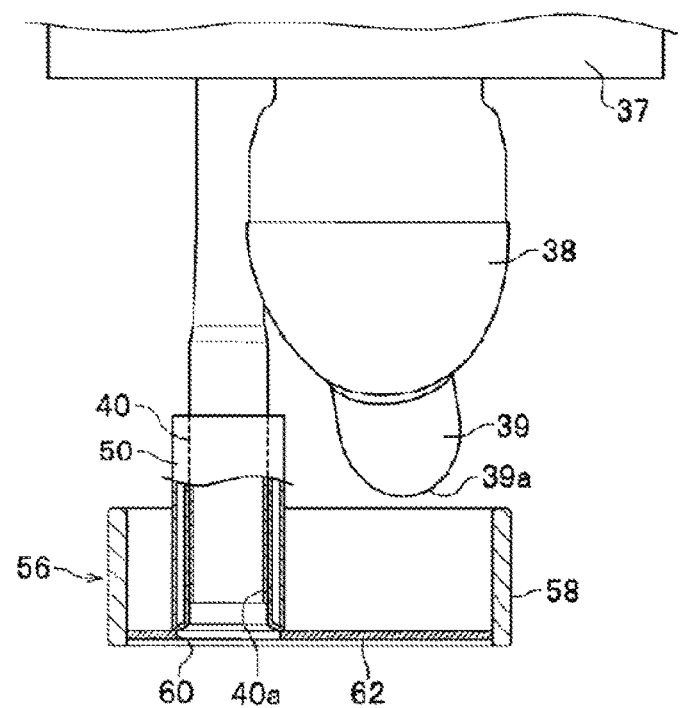
FIG. 7B is a cross sectional view taken on line VII-VII of FIG. 7A.
Figure 8A:
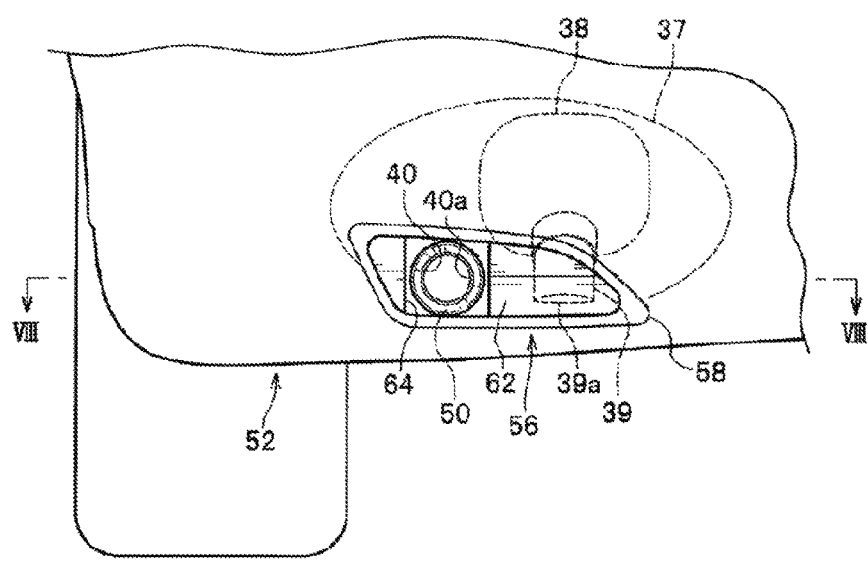
FIG. 8A is an explanatory view when viewing, from the rear side of the vehicle, a state of incorporating the finisher into the rear bumper.

FIG. 7A is an explanatory view when viewing, from the rear side of the vehicle, a state of fitting the finisher to a lower part of the rear bumper, and FIG. 7B is a cross sectional view taken on line VII-VII of FIG. 7A. FIG. 8A is an explanatory view when viewing, from the rear side of the vehicle, a state of incorporating the finisher into the rear bumper, and FIG. 8B is a cross sectional view taken on line VIII-VIII of FIG. 8A.

To the lower part of the rear bumper 52, there is fitted a finisher 56 which is widened in the vehicle width direction so as to be formed in substantially rectangular shape when viewed from the rear side of the vehicle. This finisher 56 includes a main body part 58 formed of a hollow frame body, and a shielding plate 62 which has a circular through hole 60 and shields an end surface of the main body part 58 located on the rear side of the vehicle. A diameter of the circular through hole 60 is formed to be substantially equal to or somewhat larger than an outer diameter of the exhaust port 40a of the tail pipe 40 not provided with the pressure control valve 1.

The tail pipe 39 provided with the pressure control valve 1, and the shielding plate 62 of the finisher 56 are arranged in such positions as to overlap with each other in the forward and rearward direction of the vehicle. Therefore, when viewed from the rear side of the vehicle, the shielding plate 62 of the finisher 56 has covered up the tail pipe 39 provided with the pressure control valve 1 thereby to make it difficult to inspect the tail pipe.

Figure 8B:
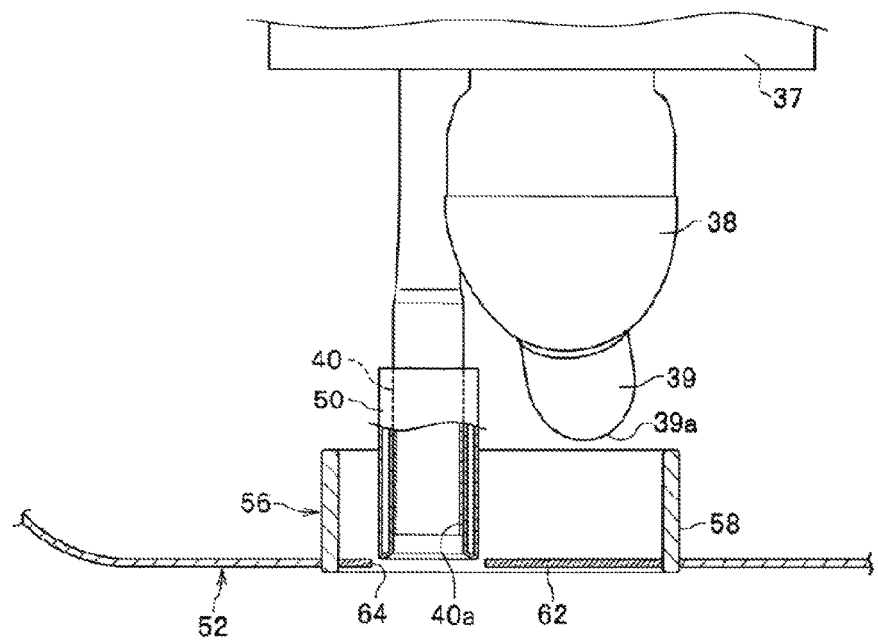
FIG. 8B is a cross sectional view taken on line VIII-VIII of FIG. 8A.

By the way, the finisher 56 shown in FIG. 8A and FIG. 8B is different from the finisher 56 shown in FIG. 7A and FIG. 7B only in that the former is incorporated into the rear bumper 52 and in that a square opening portion 64 is formed in the shielding plate 62, and other configuration and effects are identical with each other.

FIG. 9 is an enlarged cross sectional view of an essential part of the exhaust system in accordance with another embodiment, and FIG. 10 is an enlarged cross sectional view of an essential part of the exhaust system in accordance with still another embodiment. Herein, component elements identical to those of the exhaust system 100 as shown in FIGS. 1 to 6 are given like reference characters, and detailed explanation will be omitted. In addition, the tail pipe 40 not provided with the pressure control valve 1 is not illustrated in FIGS. 9 and 10.

As shown in FIG. 9, an exhaust system 200 according to another embodiment is characterized in that there is removed the tailpipe 39 which projects rearwardly of the vehicle from the valve cover 38 for covering the pressure control valve 1, and an exhaust port 66 for discharging the exhaust gas is provided in a lower part of the valve cover 38 located at the rear end of the vehicle.

As shown in FIG. 10, an exhaust system 300 according to still another embodiment is characterized in that the valve cover 38 for covering the pressure control valve 1, and the tail pipe 39 are removed, respectively, and the pressure control valve 1 is accommodated in the container 42 of the silencer. An exhaust port 68 for discharging the exhaust gas is formed in a lower part of the container 42 located at the rear end of the vehicle.

These exhaust systems 200, 300 has only the tail pipe 40 not provided with the pressure control valve 1, so that production costs can be reduced due to reduction in the number of parts, and it is possible to surely avoid the problem such as deterioration in designability, erroneous recognition, and the like.

Figure 11:
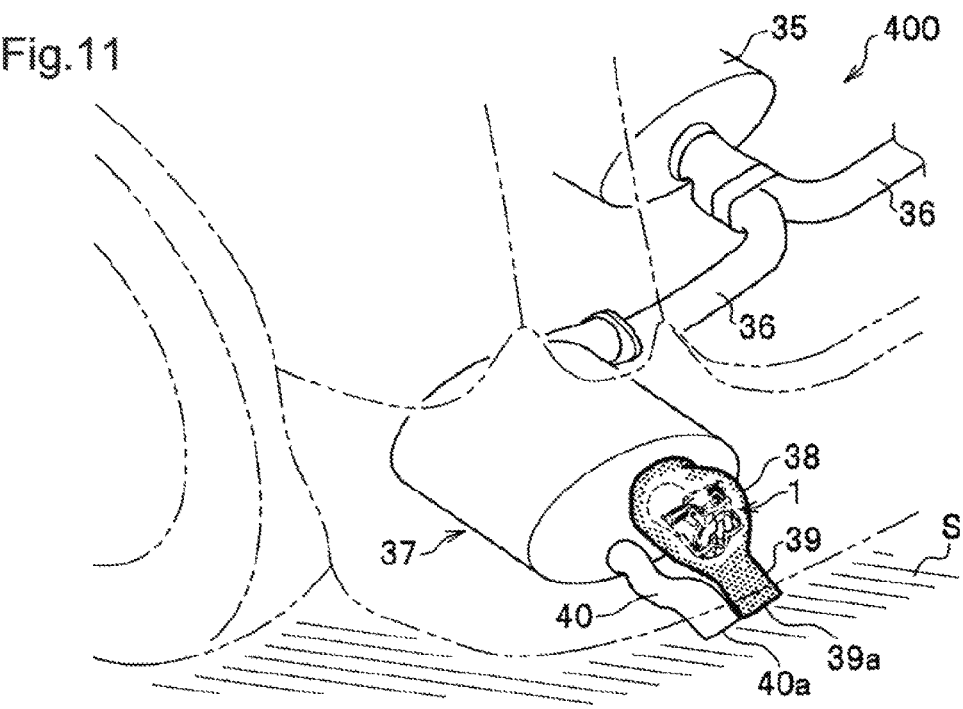
FIG. 11 is a perspective view showing a state where an outer surface of a neighboring part including an exhaust port of the tail pipe provided with a pressure control valve is colored in black, in the exhaust system in accordance with yet another embodiment.
Figure 12:
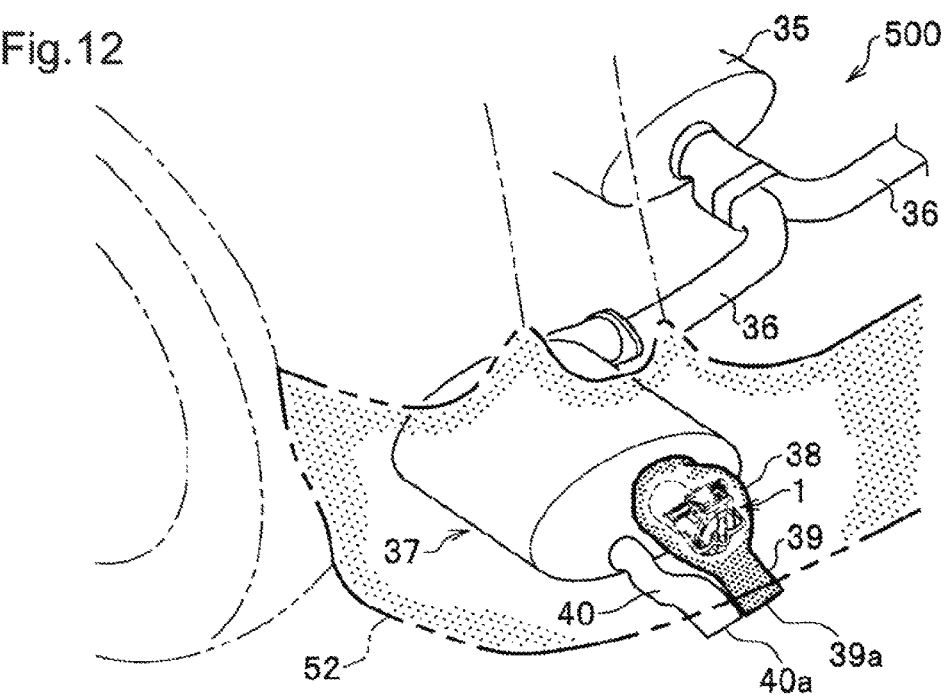
FIG. 12 is a perspective view showing a state where the outer surface of the neighboring part including the exhaust port of the tail pipe provided with the pressure control valve is colored in the same color as that of the rear bumper, in the exhaust system in accordance with still yet another embodiment.

FIG. 11 is a perspective view showing a state where an outer surface of a neighboring part including the exhaust port of the tail pipe provided with the pressure control valve is colored in black, in the exhaust system in accordance with yet another embodiment, and FIG. 12 is a perspective view showing a state where the outer surface of the neighboring part including the exhaust port of the tail pipe provided with the pressure control valve is colored in the same color as the color of the rear bumper, in the exhaust system in accordance with still yet another embodiment.

As shown in FIG. 11, in an exhaust system 400 according to yet another embodiment, the outer surface of the neighboring part including the exhaust port 39a, of the tail pipe 39 provided with the pressure control valve 1 is colored in black (see halftone dots in FIG. 11) (for example, painted in black), so that the exhaust port 39a is assimilated to the shade S of the lower part of the vehicle body.

As shown in FIG. 12, in an exhaust system 500 according to still yet another embodiment, the outer surface of the neighboring part including the exhaust port 39a, of the tail pipe 39 provided with the pressure control valve 1 is colored in the same color as the color of the rear bumper 52 (painted in the same color as that of the rear bumper 52) (see halftone dots in FIG. 12), so that the exhaust port 39a is assimilated to the rear bumper 52.

Like this, in the exhaust systems 400, 500, since the exhaust port 39a of the tail pipe 39 provided with the pressure control valve 1 is assimilated to its environs (for example, the shade S of the vehicle lower part or the rear bumper 52), the exhaust port 39a can hardly or not be inspected by the inspector who views it from the rear side of the vehicle. Therefore, it is possible to easily avoid the problems such as the deterioration in designability, the erroneous recognition, and the like.

Further, although the embodiments are explained with reference to the vehicle provided with the engine as the power plant, the present invention may be applied to a fuel cell powered vehicle which is provided with a fuel cell as the power plant.

DESCRIPTION OF REFERENCE CHARACTERS

1: Pressure control valve (control valve), 39: Tail pipe, 39a: Exhaust port, 40: Tail pipe, 40a: Exhaust port, 52: Rear bumper, 100, 200, 300, 400, 500: Exhaust system, S: Shade

The invention claimed is:

1. An exhaust system of a vehicle, comprising:
at least first and second tail pipes each connected to a power plant of the vehicle and configured to exhaust a gas discharged from the power plant, the first tail pipe being provided with a control valve which is controllable to reduce an exhaust amount of the gas exhausted from the first tail pipe when the power plant is in a low-load operation, the second tail pipe being not provided with a control valve,
wherein the first tail pipe provided with the control valve overlaps with a rear bumper in a view of a rear-to-front direction of the vehicle.

2. An exhaust system of a vehicle, comprising:
at least first and second tail pipes each connected to a power plant of the vehicle and configured to exhaust a gas discharged from the power plant, the first tail pipe being provided with a control valve which is controllable to reduce an exhaust amount of the gas exhausted from the first tail pipe when the power plant is in a low-load operation, the second tail pipe being not provided with a control valve,
wherein the first tail pipe provided with the control valve is hidden behind a rear bumper in a view of a rear-to-front direction of the vehicle.

3. An exhaust system of a vehicle, comprising:
at least first and second tail pipes each connected to a power plant of the vehicle and having respective exhaust ports to exhaust a gas discharged from the power plant, the first tail pipe being provided with a control valve which is controllable to reduce an exhaust amount of the gas exhausted from the first tail pipe when the power plant is in a low-load operation, the second tail pipe being not provided with a control valve,
wherein the exhaust port of the first tail pipe provided with the control valve is visibly assimilated to environs thereof such that the exhaust port of the first tail pipe can hardly be recognized or cannot be recognized by a person in a view of a rear-to-front direction of the vehicle.

4. The exhaust system according to claim 3, wherein the first tail pipe has an outer surface including a region of the exhaust port thereof and a region in a vicinity of the exhaust port, the outer surface being colored in black such that the exhaust port of the first tail pipe is visibly indistinguishable from shade of a lower part of a vehicle body.

5. The exhaust system according to claim 3, wherein the first tail pipe has an outer surface including a region of the exhaust port thereof and a region in a vicinity of the exhaust port, the outer surface being colored in the same color as a rear bumper such that the exhaust port of the first tail pipe is visibly indistinguishable from the rear bumper.

* * * * *